(No Model.) 2 Sheets—Sheet 1.
W. H. WOOD.
COUNTER BALANCE FOR JOURNALS.
No. 466,645. Patented Jan. 5, 1892.
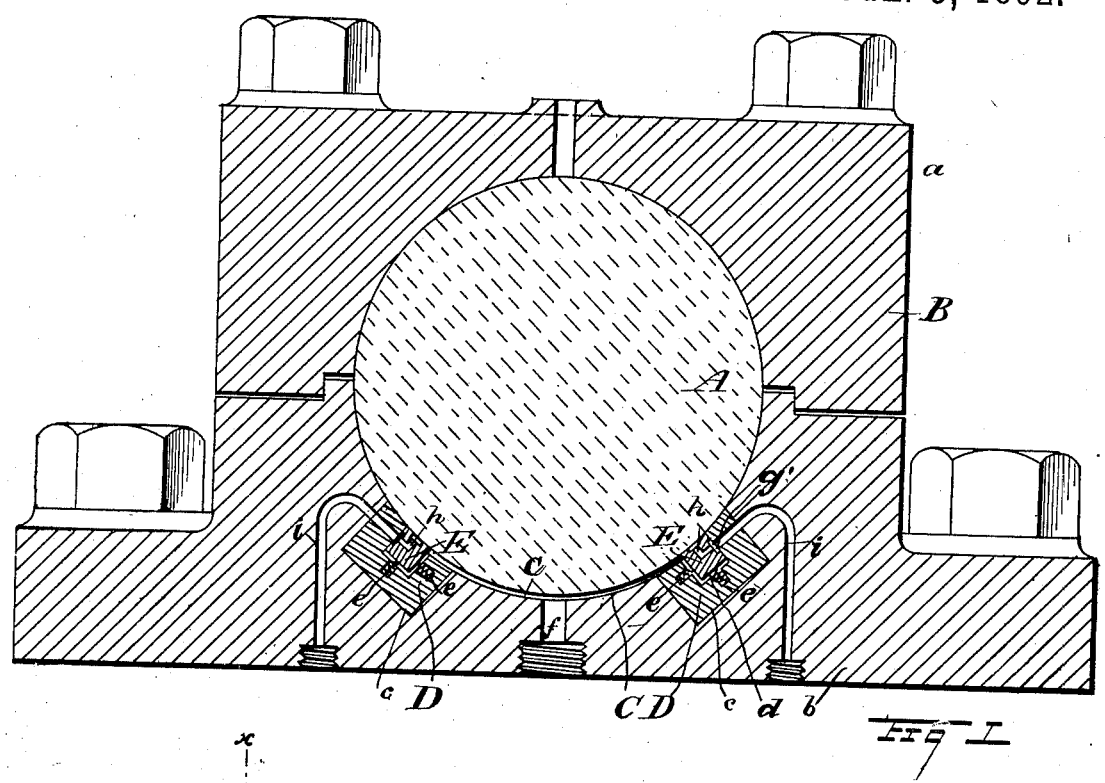
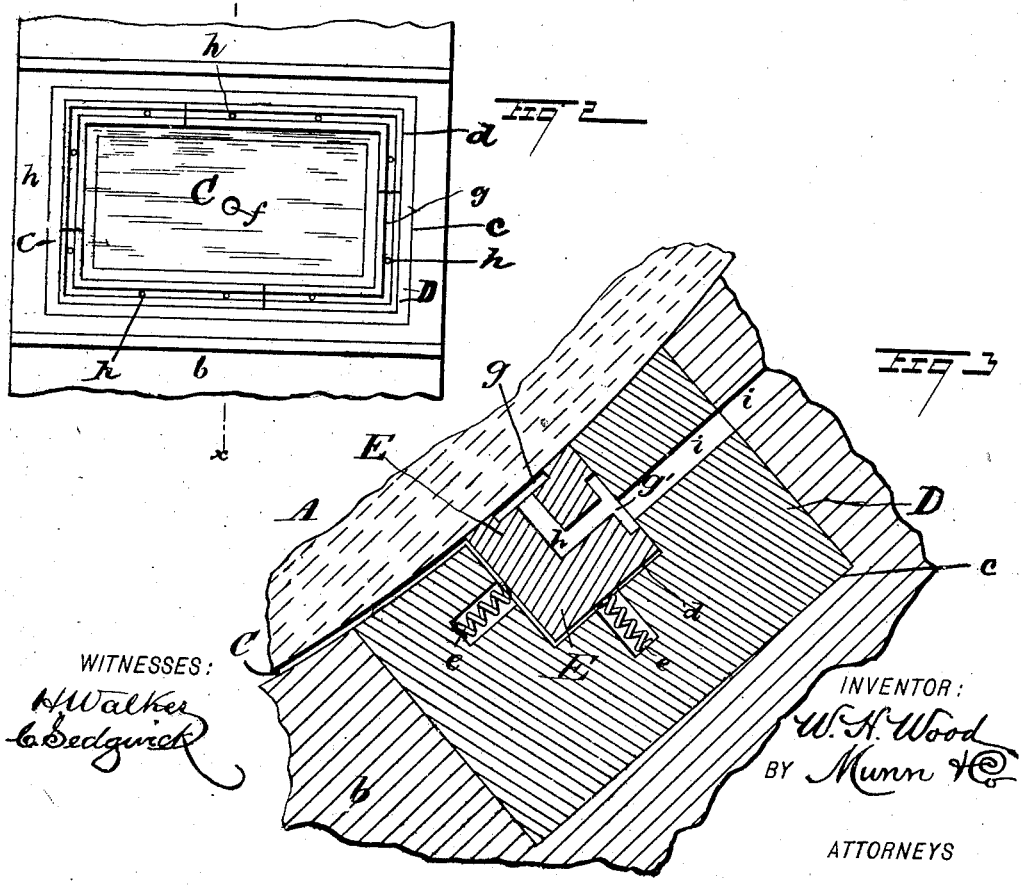
WITNESSES:
H. Walker
C. Sedgwick
INVENTOR:
W. H. Wood
BY Munn & Co.
ATTORNEYS (No Model.) 2 Sheets—Sheet 2.
W. H. WOOD.
COUNTER BALANCE FOR JOURNALS.
No. 466,645. Patented Jan. 5, 1892.
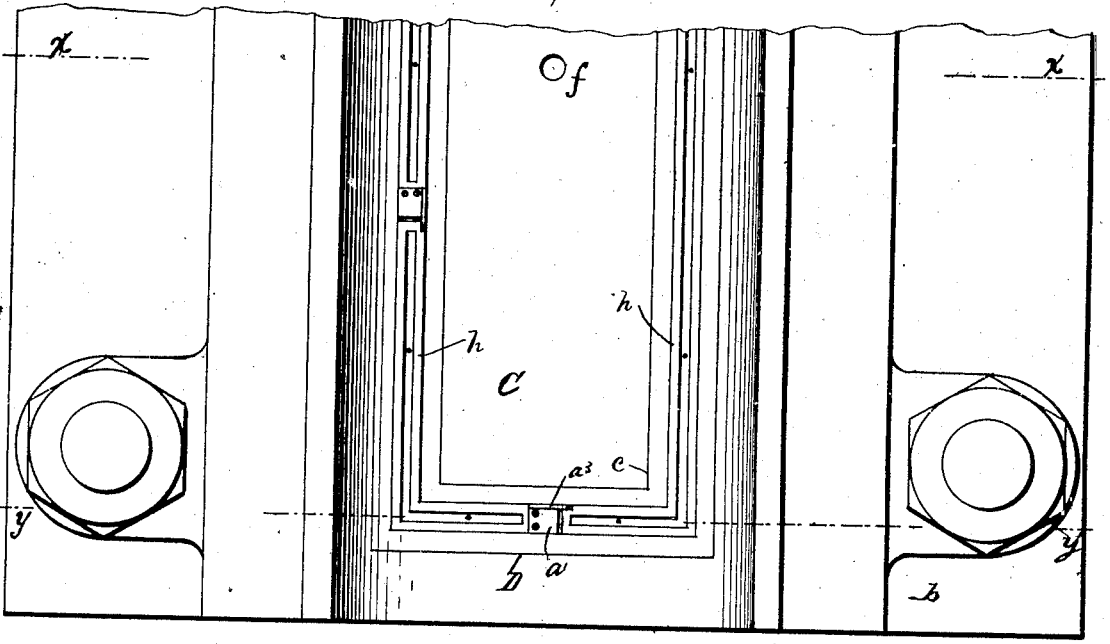
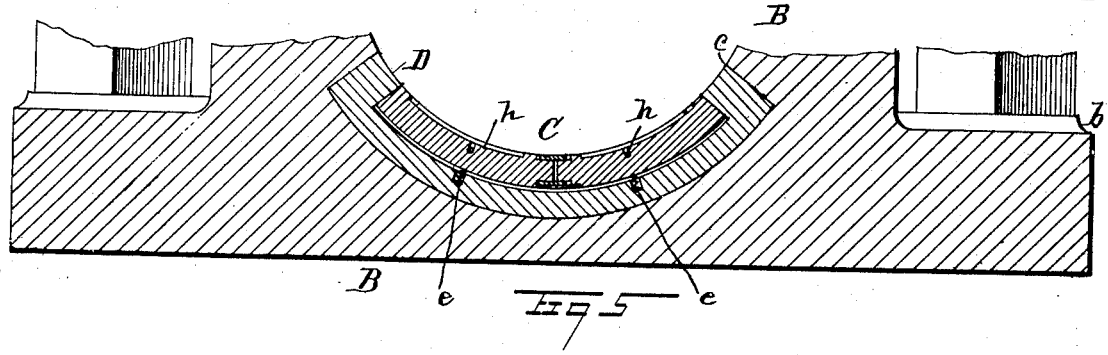
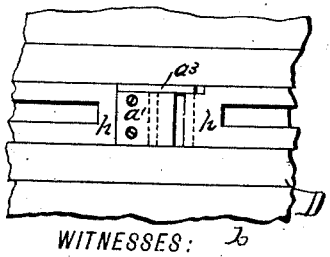
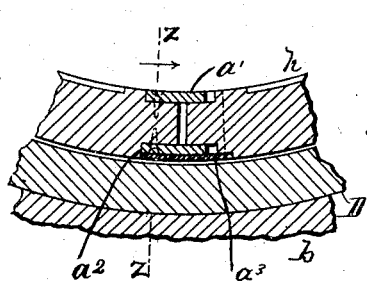
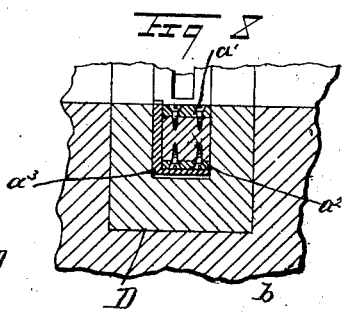
WITNESSES:
H. Walker
C. Sedgwick
INVENTOR
W. H. Wood
BY Munn & Co
ATTORNEYS.

UNITED STATES PATENT OFFICE.

WILLIAM H. WOOD, OF NEW YORK, N. Y.

COUNTER-BALANCE FOR JOURNALS.

SPECIFICATION forming part of Letters Patent No. 466,645, dated January 5, 1892.

Application filed March 12, 1891. Serial No. 384,772. (No model.)

*To all whom it may concern:*

Be it known that I, WILLIAM H. WOOD, of New York city, in the county and State of New York, have invented a new and Improved Counter-Balance for Journals, of which the following is a specification, reference being had to the annexed drawings, forming a part thereof, in which—

Figure 1 is a transverse section of a journal to which my invention has been applied. Fig. 2 is a detail plan view of the packing device, and Fig. 3 is an enlarged transverse section taken on line $x\ x$ in Fig. 2. Fig. 4 is a partial plan view of the lower half of the journal-box. Fig. 5 is a vertical transverse section taken on line $y\ y$ in Fig. 4. Fig. 6 is an enlarged plan view of the lap-joint of the packing. Fig. 7 is an enlarged longitudinal section of the same, and Fig. 8 is an enlarged transverse section taken on line $z\ z$ in Fig. 7.

Similar letters of reference indicate corresponding parts in all the views.

The object of my invention is to provide means for counterbalancing or opposing the weight or pressure of a shaft upon its journal or bearing or the thrust or pressure of any moving body revolving or sliding in frictional contact with any body, so as to reduce friction between the two surfaces to a minimum.

The invention consists in the combination, with the journal and its box, of an automatically-adjusted packing for localizing the action of the pressure-exerting medium, all as will be hereinafter more fully described, and pointed out in the claims.

I will describe my invention as applied to the journal of a horizontal shaft; but I do not limit or confine myself to this application, as the improvement may be applied to plane sliding surfaces and to thrust-blocks.

The shaft A is journaled in the journal-box B, formed of the upper and lower halves $a\ b$, which are of the usual construction, except in so far as the lower half in the present case is modified to adapt it to my invention. In the lower half of the journal-box, preferably at the central part thereof, is formed a shallow chamber C, surrounded by a right-angled groove $c$ for receiving the rectangular frame D. In the said right-angled frame is formed a rectangular groove $d$, to which is fitted the rectangular packing-frame E.

The frame D, inside of the groove $d$, is cut away to a depth corresponding to the depth of the chamber C. Below the bottom of the frame E, also within the frame D, are placed spiral springs $e$, which are arranged in holes bored in the lower half of the box and press the sides of the frame E upward toward the shaft A and outward against the outer wall of the groove $d$, thus holding the sides of the said frame E in contact with the journal of the shaft and in contact with the outer wall of the groove, so that the fluid-pressure, when exerted in a manner presently to be described, will be confined to the area inclosed by the frame E.

The frame E is preferably divided or made in four or more pieces and arranged, as shown in Figs. 2, 4, 5, 6, 7, and 8, to expand, so as to contact with the outer wall of the groove of the frame D, so that when a fluid or gas or steam under pressure is introduced into the chamber C through the aperture $f$ the pressure upon the inner surface of the frame E will force it outward and the pressure underneath it will force it upward into contact with the journal-bearing. The pressure exerted by the fluid contained in the chamber C is designed to be sufficient to nearly or quite lift the shaft A from its bearings. The joint at the adjacent ends of the pieces of the frame is formed by plates $a'\ a^2\ a^3$, attached to one end of each piece and arranged to slip over the end of the adjacent piece, which is reduced in size to admit of this arrangement. The piece $a^3$ is L-shaped and extends over the outer surface and along the under surface of the bar.

To avoid any undue pressure of the frame E against the shaft or against the outer wall of the groove in the frame D, I form a channel $g$ in the surface of the frame, which contacts with the shaft A, and a similar channel $g'$ in the outer surface of the frame E, and provide angled passages $h$ in the frame E, communicating between the channels $g\ g'$, and the channel $g'$ communicates with passages $i$, formed in the frame D and lower part $b$ of the journal-box, and I introduce a fluid under pressure through the passages $i$, which, passing through the passages $h$ into the channel $g$, opposes to a greater or less degree the pressure of the fluid in the chamber C, the two pressures being proportioned so that the frame E is forced upwardly and outwardly with only sufficient force to produce a fluid-tight joint.

When the pressure of the shaft A upon its bearing is constant, the pressure of the fluid in the chamber C and in the passages $i$ is also constant; but where the pressure of the shaft upon its journal-bearings is variable I provide means for varying the fluid-pressure to correspond with the variations of pressure of the shaft upon its bearings.

In some cases I may omit the frame D and fit the frame E directly to a rectangular groove in the journal-box. When the pressure is alternating in opposite directions, I provide two chambers C and accompanying devices and alternate the pressure in the chambers.

My improvement is designed more particularly for application to heavy journal-bearings; but it may with advantage be applied to lighter bearings.

Having thus described my invention, I claim as new and desire to secure by Letters Patent—

1. In apparatus for counterbalancing journals, the combination, with a shaft and journal-box fitted to the shaft and provided with a groove for receiving packing, of an adjustable packing fitted to the groove and to the shaft, ducts connected with the groove and supplied with a fluid under pressure, and a duct leading to the space in the journal-box within the packing and containing fluid under pressure.

2. The combination, with a shaft and journal-box fitted to the shaft and provided with a chamber for receiving a fluid under pressure, of a packing surrounding the chamber and pressed into contact with the shaft by a fluid under pressure, substantially as specified.

3. The combination of the shaft A, the journal-box B, provided with a chamber C, rectangular groove $d$, and passages $f\ i$, and the expansible spring-pressed frame E, provided with passages $h$ and channels $g\ g'$, substantially as specified.

WILLIAM H. WOOD.

Witnesses:
   E. M. CLARK,
   C. SEDGWICK.